(12) United States Patent
Kim et al.

(10) Patent No.: US 12,105,000 B2
(45) Date of Patent: Oct. 1, 2024

(54) FINE DUST MEASUREMENT MODULE AND FINE DUST MEASUREMENT DEVICE

(71) Applicants: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

(72) Inventors: Ilhwan Kim, Yongin-si (KR); Sejin Yook, Seoul (KR); Gibong Sung, Seoul (KR); Seokwhan Chung, Hwaseong-si (KR)

(73) Assignees: SAMSUNG ELECTRONICS CO., LTD., Suwon-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 322 days.

(21) Appl. No.: 17/682,858

(22) Filed: Feb. 28, 2022

(65) Prior Publication Data

US 2023/0056602 A1 Feb. 23, 2023

(30) Foreign Application Priority Data

Aug. 19, 2021 (KR) .......................... 10-2021-0109638

(51) Int. Cl.
*G01N 15/02* (2024.01)
*G01N 1/22* (2006.01)
(Continued)

(52) U.S. Cl.
CPC ....... *G01N 15/0272* (2013.01); *G01N 1/2273* (2013.01); *G01N 15/0255* (2013.01);
(Continued)

(58) Field of Classification Search
CPC ............. G01N 15/0272; G01N 1/2273; G01N 15/0255; G01N 15/06; G01N 2015/0046;
(Continued)

(56) References Cited

U.S. PATENT DOCUMENTS

| 4,767,524 A | 8/1988 | Yeh et al. |
| 7,836,751 B2 | 11/2010 | Marra |

(Continued)

FOREIGN PATENT DOCUMENTS

| DE | 102016102597 A1 * | 8/2016 | .............. F01N 11/00 |
| JP | 2012-233796 A | 11/2012 | |

(Continued)

OTHER PUBLICATIONS

Lyes Djoumi et al., "Real Time Cascade Impactor Based on Surface Acoustic Wave Delay Lines for PM10 and PM2.5 Mass Concentration Measurement", Sensors, 18, 255, doi:10.3390/s18010255, MDPI, Jan. 2018, 11 pages total.

(Continued)

*Primary Examiner* — Benjamin R Schmitt
(74) *Attorney, Agent, or Firm* — Sughrue Mion, PLLC

(57) ABSTRACT

There is provided a fine dust measurement module that includes a fluid inlet into which fluid including fine dust with particles of various diameters is flowed, a first channel through which, of the fine dust introduced through the fluid inlet, first fine dust with particles having a diameter greater than or equal to a first diameter passes, a second channel through which, of the fine dust introduced through the fluid inlet, second fine dust with particles having a diameter less than the first diameter passes, a flow ratio control nozzle arranged in the first channel and configured to control a flow ratio between fluid flowing into the first channel and fluid (Continued)

flowing into the second channel, and a fine dust sensor configured to sense fine dust flowing into the second channel.

23 Claims, 11 Drawing Sheets

(51) Int. Cl.
  *G01N 15/06* (2006.01)
  *G01N 15/00* (2006.01)
  *G01N 15/10* (2006.01)
(52) U.S. Cl.
  CPC ..... *G01N 15/06* (2013.01); *G01N 2015/0046* (2013.01); *G01N 2015/0096* (2013.01); *G01N 2015/0277* (2013.01); *G01N 2015/0288* (2013.01); *G01N 2015/1021* (2024.01)
(58) Field of Classification Search
  CPC ... G01N 2015/0096; G01N 2015/0277; G01N 2015/0288; G01N 2015/1021
  See application file for complete search history.

(56) References Cited

U.S. PATENT DOCUMENTS

| | | |
|---|---|---|
| 8,806,915 B2 | 8/2014 | White et al. |
| 2009/0288475 A1 | 11/2009 | Ariessohn et al. |
| 2015/0355084 A1 | 12/2015 | White |
| 2017/0097255 A1 | 4/2017 | Karakaya |
| 2020/0217771 A1 | 7/2020 | Boersma |

FOREIGN PATENT DOCUMENTS

| | | | | |
|---|---|---|---|---|
| KR | 101411333 B1 | * | 6/2014 | ............. G01N 15/10 |
| KR | 10-1865516 B1 | | 6/2018 | |
| KR | 20190063082 A | * | 6/2019 | ........... G01N 1/2202 |
| KR | 10-2215223 B1 | | 2/2021 | |

OTHER PUBLICATIONS

Masashi Wada et al., "A Two-Stage Virtual Impactor for In-Stack Sampling of PM2.5 and PM10 in Flue Gas of Stationary Sources", Aerosol and Air Quality Research, 16, doi: 10.4209/aaqr.2015.06.0383, 2016, 10 pages total.

\* cited by examiner

FINE DUST MEASUREMENT MODULE AND FINE DUST MEASUREMENT DEVICE

CROSS-REFERENCE TO RELATED APPLICATION

This application is based on and claims priority under 35 U.S.C. § 119 to Korean Patent Application No. 10-2021-0109638, filed on Aug. 19, 2021, in the Korean Intellectual Property Office, the disclosure of which is incorporated by reference herein in its entirety.

BACKGROUND

1. Field

Example embodiments consistent with the present disclosure relate to fine dust measurement modules and fine dust measurement devices, and more particularly, to fine dust measurement modules and fine dust measurement devices which are capable of classifying fine dust in air by diameter for quick and effective identification and also have a simple structure.

2. Description of Related Art

Depending on the particle size, dust can be classified into total suspended particles (TSP) having a particle size less than or equal to 50 μm and fine dust having a very small particle size. Also, according to a particle diameter, fine dust can be further classified into particulate matter (PM) 10 having a particle diameter less than 10 μm and PM 2.5 having a particle diameter less than 2.5 μm. PM 10 and PM 2.5 are also referred to as fine dust and ultrafine dust, respectively, but generally they are collectively referred to as fine dust and further classified into PM 10 and PM 2.5.

Fine dust causes not only environmental pollution but also health problems, such as damage to respiratory organs, etc. Accordingly, technologies that facilitate reduction of fine dust and measurement of fine dust concentration have been required. In particular, virtual impactors may be used to classify fine dust by particle size and measure the fine dust concentration. However, when virtual impactors are arranged in a multi-stage structure, the size of fine dust measurement device may increase or the structure of the fine dust measurement device may become complex.

SUMMARY

Example embodiments provide fine dust measurement modules and fine dust measurement devices which are capable of classifying fine dust in air by diameter for quick and effective identification and also have a simple structure. However, such technical object is provided merely as an example, and thus does not pose a limitation on the scope of the present disclosure.

Additional aspects will be set forth in part in the description which follows and, in part, will be apparent from the description, or may be learned by practice of embodiments of the disclosure.

In accordance with an aspect of the disclosure, a fine dust measurement module includes a fluid inlet into which a fluid flows, the fluid including fine dust with particles of various diameters; a first channel through which, of the fine dust introduced through the fluid inlet, first fine dust with first particles having a diameter greater than or equal to a first diameter passes; a second channel through which, of the fine dust introduced through the fluid inlet, second fine dust with second particles having a diameter less than the first diameter passes; a flow ratio control nozzle arranged in the first channel and configured to control a flow ratio between a first portion of the fluid flowing into the first channel and a second portion of the fluid flowing into the second channel; and a fine dust sensor configured to sense the second fine dust passing through the second channel.

The flow ratio between the first portion of the fluid flowing into the first channel and the second portion of the fluid flowing into the second channel may be 1:9.

The second channel may include a first sub-channel and a second sub-channel which each diverge from the first channel; and a first merged region in which the first sub-channel and the second sub-channel are merged.

The fine dust sensor may be arranged in the first merged region.

The fine dust sensor may include a mass sensor configured to directly sense a mass of the second fine dust passing through the second channel.

The fine dust measurement module may further include a micro-heater arranged across the second channel from the fine dust sensor.

The first channel may include a first region arranged on a same plane as the second channel; a second region connected to the first region and arranged on a different plane than the second channel; and a third region connected to the second region and arranged on the same plane as the second channel.

The first channel may further include a first connection connecting the first region to the second region; and a second connection connecting the second region to the third region.

The fine dust measurement module may further include a second merged region in which the first channel and the second channel are merged; and an outlet connected to the second merged region and discharging the fluid.

A ratio of an internal pressure of the outlet to a first pressure inside the second merged region may be less than or equal to 0.528.

The fine dust measurement module may further include a choked nozzle arranged between the second merged region and the outlet.

The fine dust measurement module may further include a pump connected to the outlet and configured to control the internal pressure of the outlet.

In accordance with an aspect of the disclosure, a fine dust measurement device includes a first fine dust measurement module including a first fluid inlet; a second fine dust measurement module including a second fluid inlet; a third fine dust measurement module including a third fluid inlet; and an outlet connected to each one of the first fine dust measurement module, the second fine dust measurement module, and the third fine dust measurement module.

The first fine dust measurement module, the second fine dust measurement module, and the third fine dust measurement module may be arranged in parallel.

Each of the first fine dust measurement module, the second fine dust measurement module, and the third fine dust measurement module may include a respective one of a first channel through which a first fine dust passes, the first fine dust being included in a fluid introduced through a respective one of the first fluid inlet, the second fluid inlet, and the third fluid inlet, the first fine dust including first particles having a diameter greater than or equal to a preset diameter; a second channel through which a second fine dust passes, the second fine dust being included in the fluid introduced through the respective one of the first fluid inlet, the second fluid inlet, and the third fluid inlet, the second fine dust including second particles having a diameter less than the preset diameter; a flow ratio control nozzle arranged in the first channel and configured to control a flow ratio between a first portion of the fluid flowing into the first channel and a second portion of the fluid flowing into the second channel; and a fine dust sensor configured to sense the second fine dust passing through the second channel.

Each of the first fine dust measurement module, the second fine dust measurement module, and the third fine dust measurement module may further include a connection channel connecting the respective one of the first fluid inlet, the second fluid inlet, and the third fluid inlet to the respective first channel and the respective second channel, and each respective connection channel may have a different cross-sectional area from each other respective connection channel.

For each of the first fine dust measurement module, the second fine dust measurement module, and the third fine dust measurement module, the flow ratio between the first portion of the fluid flowing into the first channel and the second portion of the fluid flowing into the second channel may be 1:9.

Each of the first fine dust measurement module, the second fine dust measurement module, and the third fine dust measurement module may further include a merged region in which the first channel and the second channel are merged.

For each of the first fine dust measurement module, the second fine dust measurement module, and the third fine dust measurement module, a ratio of an internal pressure of the outlet to a pressure inside the merged region may be less than or equal to 0.528.

The fine dust measurement device may further include a first choked nozzle arranged between the merged region of the first fine dust measurement module and the outlet; a second choked nozzle arranged between the merged region of the second fine dust measurement module and the outlet; and a third choked nozzle arranged between the merged region of the third fine dust measurement module and the outlet.

The fine dust measurement device may further include a pump connected to the outlet and configured to control an internal pressure of the outlet.

For each of the first fine dust measurement module, the second fine dust measurement module, and the third fine dust measurement module, the fine dust sensor may include a mass sensor configured to directly sense a mass of the second fine dust passing through the second channel.

Each of the first fine dust measurement module, the second fine dust measurement module, and the third fine dust measurement module may further include a microheater arranged across the second channel from the fine dust sensor.

The first channel of each of the first fine dust measurement module, the second fine dust measurement module, and the third fine dust measurement module may include a first region arranged on the same plane as the second channel; a second region connected to the first region and arranged on a different plane than the second channel; and a third region connected to the second region and arranged on the same plane as the second channel.

Other aspects, features, and advantages which are different than those described above will become apparent from the below detailed description, claims and drawings.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
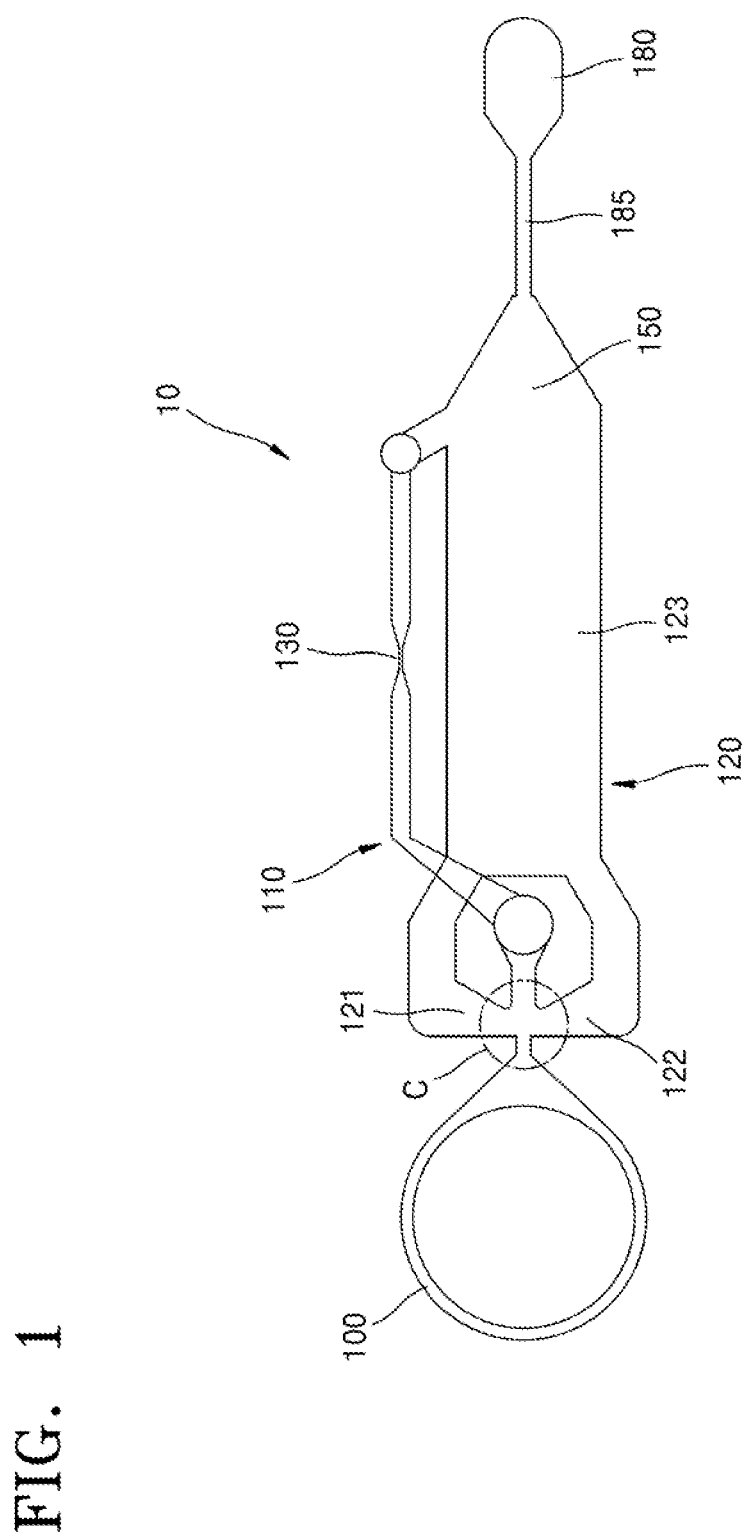
FIG. 1 is a plan view schematically illustrating a fine dust measurement module according to an example embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

As the disclosure allows for various changes and numerous embodiments, example embodiments will be illustrated in the drawings and described in detail in the written description. The effects and features of the disclosure, as well as the methods to achieve them will become apparent with reference to the below embodiments described in detail along with the drawings. However, the disclosure may be embodied in many different forms and should not be construed as limited to the example embodiments set forth herein.

Hereinafter, example embodiments are described in detail with reference to the attached drawings. Like or corresponding reference numerals in the drawings denote like elements, and any redundant descriptions thereon will be omitted.

It will be understood that when a component, such as a layer, a film, a region, or a plate, is referred to as being "on" another component, the component can be directly on the other component or intervening components may be present thereon. Sizes of components in the drawings may be exaggerated or reduced for convenience of explanation. In other words, since sizes and thicknesses of components in the drawings are arbitrarily illustrated for convenience of explanation, the disclosure is not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 2:
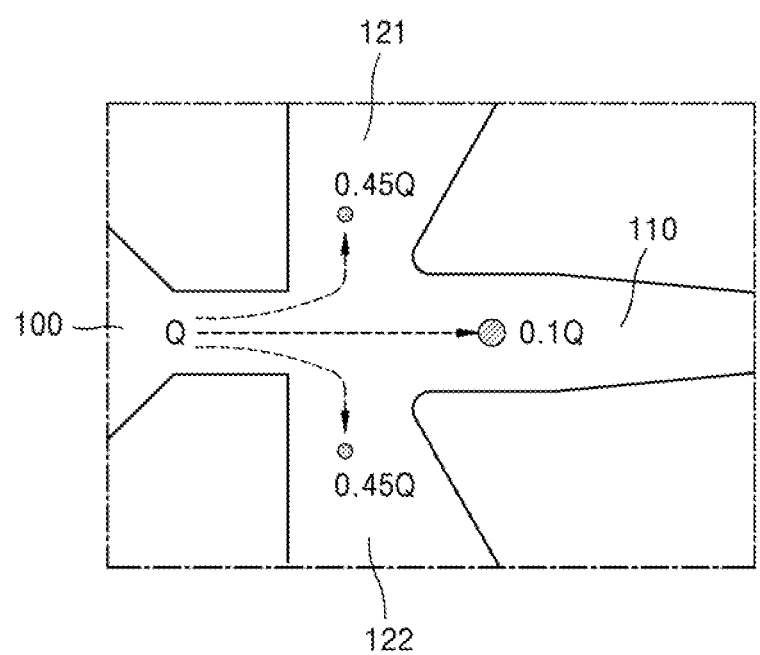
FIG. 2 is an enlarged diagram schematically illustrating a fine dust classifying region of FIG. 1.
Figure 3:
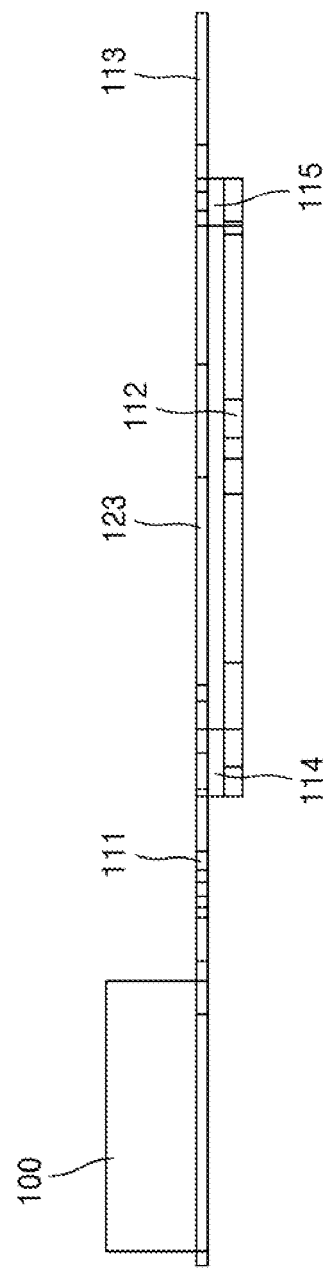
FIG. 3 is a side view of the fine dust measurement module of FIG. 1.
Figure 4:
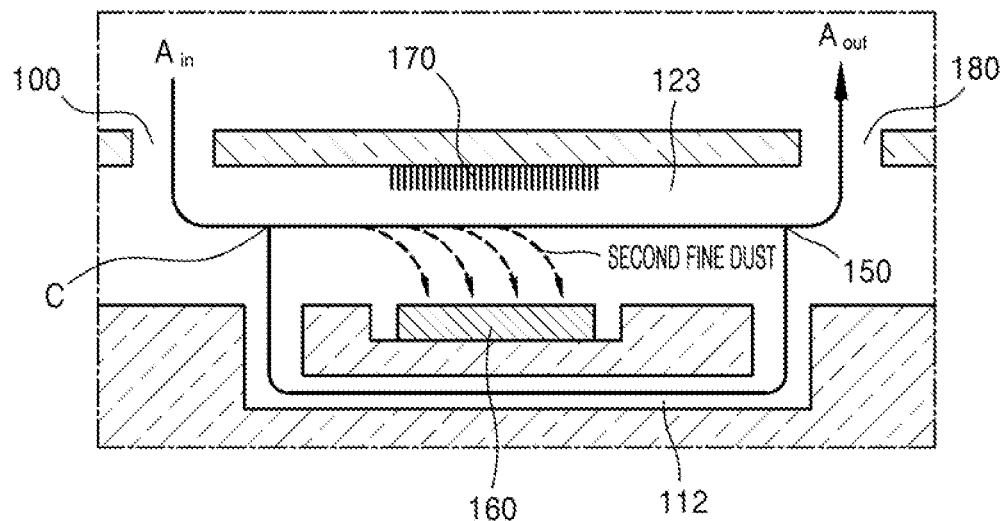
FIG. 4 is a schematic diagram of the fine dust measurement module shown in FIG. 3.

FIG. 1 is a plan view schematically illustrating a fine dust measurement module according to an example embodiment. FIG. 2 is an enlarged diagram schematically illustrating a fine dust classifying region C of FIG. 1. FIG. 3 is a side view of the fine dust measurement module of FIG. 1. FIG. 4 is a schematic diagram of the fine dust measurement module shown in FIG. 3.

With reference to FIGS. 1 to 4, a fine dust measurement module 10 according to an example embodiment may include a fluid inlet 100, a first channel 110, a second channel 120, a flow ratio control nozzle 130, a third channel 150, a fine dust sensor 160, a micro-heater 170, and an outlet 180.

The fluid inlet 100 refers to a fluid inflow passage into which fluid $A_{in}$ including fine dust may flow. Here, the fluid $A_{in}$ including fine dust refers to gas containing particles, and may be understood as, for example, polydisperse aerosol. Further, the fluid $A_{in}$ flowing into the fluid inlet 100 may include fine dust or ultrafine dust having various particle diameters. Fine dust and ultrafine dust are classified based on a particle diameter.

The fluid inlet 100 according to an example embodiment may be arranged on the first channel 110 and the second channel 120. Specifically, the fluid inlet 100 may be formed on the second channel 120 in a direction facing the first channel 110 described below. At this time, the fluid inlet 100 may be formed to have a diameter greater than a diameter of the first channel 110. However, the disclosure is not limited thereto, and the fluid inlet 100 may have a diameter less than or equal to the diameter of the first channel 110.

The fluid $A_{in}$ which has flowed into the fluid inlet 100 in a vertical direction (e.g., an up-down direction as shown in FIG. 4) may move farther downward in the vertical direction due to inertia. At this time, among aerosol particles included in the fluid $A_{in}$, particles (e.g., first particles) having great inertia may be discharged to the first channel 110 functioning as a minor flow, and particles (e.g., second particles) having weak inertia may be discharged to the second channel 120 functioning as a major flow.

The first channel 110 may classify aerosol particles included in the fluid $A_{in}$ which has flowed into the fluid inlet 100 based on inertia. At this time, the first channel 110 may classify first fine dust (e.g., particles having great inertia) which has a diameter greater than or equal to a reference diameter, i.e., a first diameter or a preset diameter. Here, the first diameter may be determined by a flow ratio between the first channel 110 functioning as a minor flow and the second channel 120 functioning as a major flow.

A part of the first channel 110 according to an example embodiment may be formed on a different plane than the second channel 120. For example, as shown in FIG. 3, the first channel 110 may include an eleventh channel (e.g., a first region) 111, a twelfth channel (e.g., a second region) 112, a thirteenth channel (e.g., a third region) 113, a first connection 114, and a second connection 115. The eleventh channel 111 may be arranged below the fluid inlet 100 to intercommunicate with the fluid inlet 100, and on the same plane as the second channel 120. The twelfth channel 112 may be connected to the eleventh channel 111, and arranged on a different plane than the second channel 120. The thirteenth channel 113 may be connected to the twelfth channel 112, and arranged on the same plane as the second channel 120. At this time, the first connection 114 may extend in a thickness direction of the fine dust measurement module 10 and connect the eleventh channel 111 and the twelfth channel 112 which are arranged on different planes. Also, the second connection 115 may extend in a thickness direction of the fine dust measurement module and connect the twelfth channel 112 and the thirteenth channel 113 which are arranged on different planes. Accordingly, the second channel 120 described below may form a twenty-third channel (e.g., a first merged region) 123 in which a twenty-first channel (e.g., a first sub-channel) 121 and a twenty-second channel (e.g., a second sub-channel) 122 are merged without interference of the first channel 110.

The second channel 120 may classify aerosol particles included in the fluid $A_{in}$ which has flowed into the fluid inlet 100 based on inertia. At this time, the second channel 120 may classify second fine dust (e.g., particles having weak inertia) which has a diameter less than the reference diameter, i.e., the first diameter.

The second channel 120 according to an example embodiment may include the twenty-first channel 121 and the twenty-second channel 122 which diverge with respect to the first channel 110, and the twenty-third channel 123 in which the twenty-first channel 121 and the twenty-second channel 122 are merged. For example, as shown in FIG. 2, the twenty-first channel 121 and the twenty-second channel 122 may extend between the fluid inlet 100 and the first channel 110 in a direction opposite to each other and may intercommunicate with each other. That is, the twenty-first channel 121 and the twenty-second channel 122 may be arranged to face each other with respect to a fine dust classifying region C formed between the fluid inlet 100 and the first channel 110, and may intercommunicate with each other.

The twenty-first channel 121 and the twenty-second channel 122 may be merged in the twenty-third channel 123. At this time, the second fine dust (particles having weak inertia) which has a diameter less than the first diameter may be classified in the fine dust classifying region C and assembled in the twenty-third channel 123. As shown in FIG. 3, a part of the first channel 110, for example, the twelfth channel 112 may be formed on a different plane than the twenty-third channel 123. Accordingly, the twenty-third channel 123 may assemble the second fine dust (particles having weak inertia) which has a diameter less than the first diameter, without interference with the first channel 110. At this time, the fine dust sensor 160 may be arranged in the twenty-third channel 123, which will be described later. Accordingly, a concentration of target fine dust, for example, the second fine dust (particles having weak inertia) may be sensed by using one fine dust sensor 160.

The flow ratio control nozzle 130 may be arranged along the first channel 110 and control a flow ratio between fluid (e.g., a first portion of the fluid) flowing into the first channel 110 and fluid (e.g., a second portion of the fluid) flowing into the second channel 120. For example, as shown in FIG. 2, a flow quantity Q of the fluid $A_{in}$ which has flowed into the fluid inlet 100 may be divided and introduced into the first channel 110 and the second channel 120, more specifically, the twenty-first channel 121 and the twenty-second channel 122. At this time, a cross-sectional area of the flow ratio control nozzle 130 may be adjusted to control a flow ratio between fluid flowing into the first channel 110 and fluid flowing into the twenty-first channel 121 and the twenty-second channel 122. For example, a flow quantity 0.1Q of the fluid flowing into the first channel 110 may be 10% of the flow quantity Q of the fluid $A_{in}$ which has flowed into the fluid inlet 100, and a flow quantity 0.45Q of the fluid flowing into each of the twenty-first channel 121 and the twenty-second channel 122 may be 45% of the flow quantity Q of the fluid $A_{in}$ which has flowed into the fluid inlet 100. That is, a flow ratio between the fluid flowing into the first channel 110 and the fluid flowing into the second channel 120 may be 1:9.

The third channel (e.g., a second merged region or a merged region) 150 may be a merger channel in which the fluid which has passed the first channel 110 and the fluid which has passed the second channel 120 are merged. For example, the third channel 150 may be arranged to intercommunicate with the outlet 180 with a choked nozzle 185 provided therebetween.

The fine dust sensor 160 may be a sensor configured to sense concentration of the second fine dust (particles having weak inertia) introduced into the second channel 120. For example, the fine dust sensor 160 may use, for example, a weight measurement method for directly measuring the mass of fine dust, a beta ray measurement method, a light scattering measurement method, etc., but the disclosure is not limited thereto. The fine dust sensor 160 according to an example embodiment may be implemented as a mass sensor which directly measures the mass of fine dust, and in this case the mass sensor may use one or more methods from among the surface acoustic wave measurement method, bulk acoustic wave measurement method, and quartz crystal microbalance measurement method.

As described above, a part of the first channel 110 may be arranged in a different plane than the second channel 120, and the twenty-third channel 123 in which the twenty-first channel 121 and the twenty-second channel 122 are merged may be formed. At this time, the fine dust sensor 160 may be arranged in the twenty-third channel 123. Accordingly, there is no need to arrange the fine dust sensor 160 separately in each of the twenty-first channel 121 and the twenty-second channel 122, and the concentration of the second fine dust (particles having weak inertia) may be measured by using one fine dust sensor 160.

The micro-heater 170 (see, e.g., FIG. 4) may be a heater configured to apply heat to the second fine dust (particles having weak inertia) introduced into the second channel 120. The micro-heater 170 according to an example embodiment may be arranged above the fine dust sensor 160 and apply heat to the second fine dust (particles having weak inertia) introduced into the second channel 120. At this time, the second fine dust (particles having weak inertia) may be collected at the fine dust sensor 160 due to the thermophoretic effect.

The outlet 180 may be a discharge member configured to discharge fluid $A_{out}$ of which the second dust (particles having weak inertia) concentration has been measured. For example, the outlet 180 may be arranged to intercommunicate with the third channel 150 with the choked nozzle 185 provided therebetween. An internal pressure of the outlet 180 may be adjusted by a pump 190 (see FIG. 5). At this time, a ratio between a first pressure $P_1$ (see FIG. 5) inside the third channel 150 and a second pressure $P_2$ (see FIG. 5) inside the outlet 180 may be maintained lower than or equal to a certain ratio, and accordingly, a flow quantity of fluid flowing in the fine dust measurement module 10 may be controlled to remain constant. This is explained in more detail below with reference to FIGS. 5 and 6.

Figure 5:
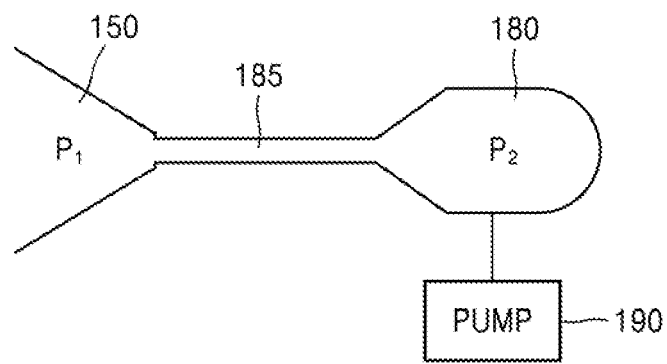
FIG. 5 is a schematic diagram illustrating a third channel, a choked nozzle, an outlet, and a pump according to an example embodiment.
Figure 6:
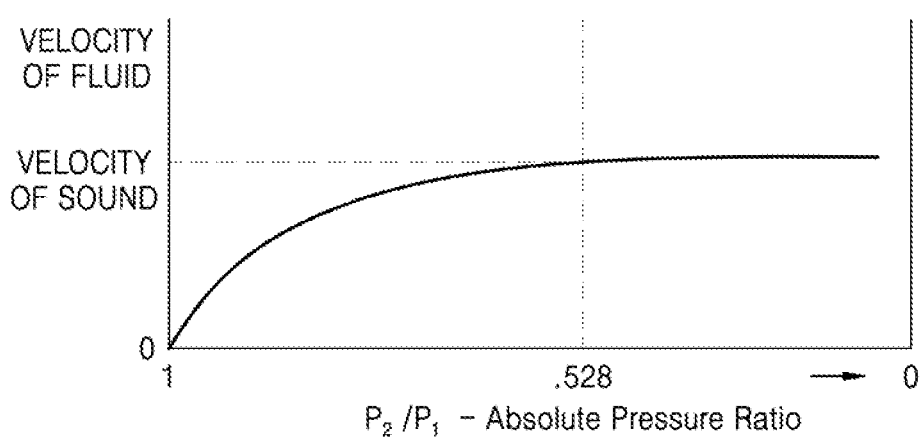
FIG. 6 is a graph showing the relationship between a ratio of a second pressure inside an outlet to a first pressure inside a third channel and a velocity of fluid passing through a choked nozzle.

FIG. 5 is a schematic diagram illustrating a third channel 150, a choked nozzle 185, an outlet 180, and a pump 190 according to an example embodiment. FIG. 6 is a graph showing the relationship between a ratio of a second pressure inside an outlet to a first pressure inside a third channel, and a velocity of fluid passing through a choked nozzle.

With reference to FIGS. 1 and 4, the fluid $A_{in}$ introduced through the fluid inlet 100 may be diverged into the first channel 110 and the second channel 120 in the fine dust classifying region C. At this time, the concentration of the second fine dust (particles having weak inertia) introduced into the second channel 120 may be detected by the fine dust sensor 160. After the concentration of the second fine dust (particles having weak inertia) is detected, the fluid diverged into the first channel 110 and the second channel 120 may be merged again in the third channel 150. The fluid merged in the third channel 150 may be discharged to the outside through the outlet 180. At this time, as described above, the outlet 180 may be arranged to intercommunicate with the third channel 150 with the choked nozzle 185 provided therebetween.

With reference to FIGS. 5 and 6, for example, the choked nozzle 185 may be arranged between the third channel 150 and the outlet 180, and when a ratio of the second pressure $P_2$ inside the outlet 180 to the first pressure $P_1$ inside the third channel 150 is maintained lower than or equal to a certain ratio, for example, 0.528, the velocity of the fluid passing through the choked nozzle 185 may be maintained at a constant velocity. For example, by controlling the ratio of the second pressure $P_2$ inside the outlet 180 to the first pressure $P_1$ inside the third channel 150 to be less than or equal to 0.528 by using the pump connected to a cross-sectional area of the choked nozzle 185 and the outlet 180, the velocity of fluid passing through the choked nozzle 185 may remain constant. The flow quantity of fluid flowing in the fine dust measurement module 10 may be controlled to be constant, and accordingly, the accuracy of fine dust measurement may increase.

Figure 7:
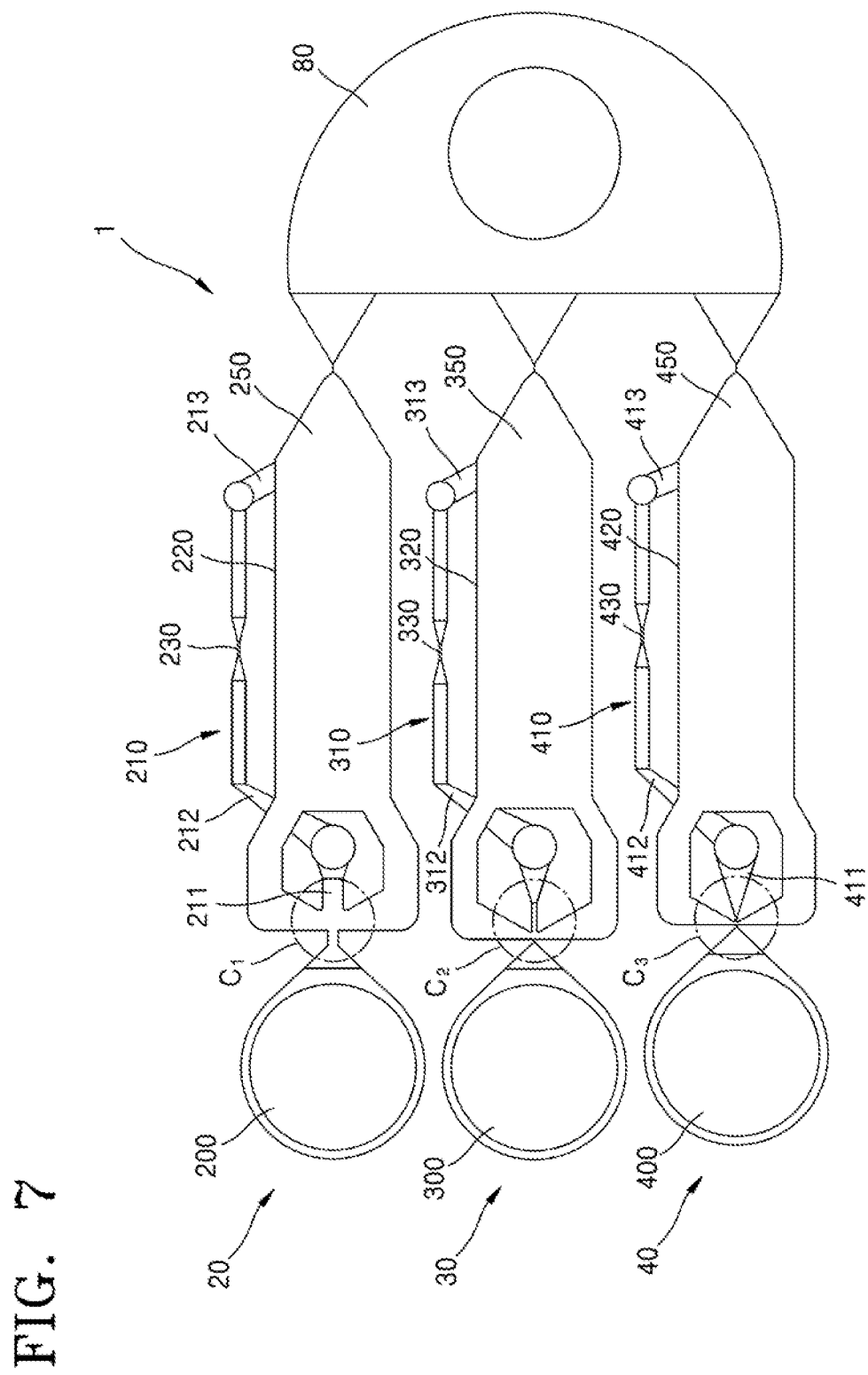
FIG. 7 is a plan view schematically illustrating a fine dust measurement device according to an example embodiment.
Figure 8A:
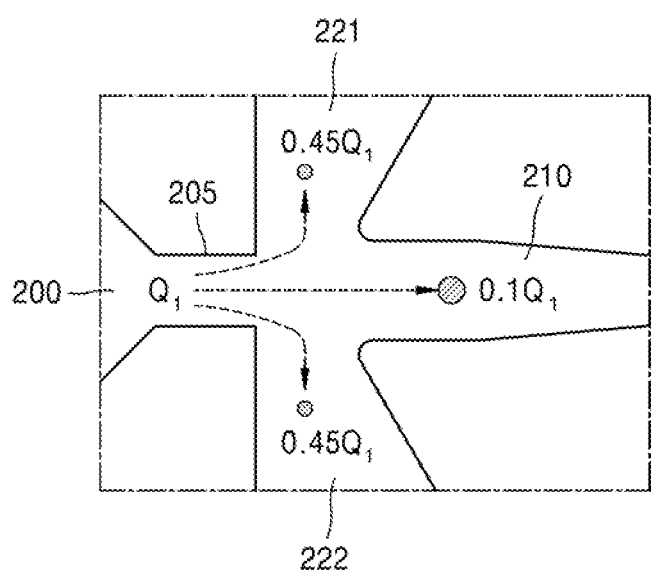
FIG. 8A is an enlarged diagram schematically illustrating a first fine dust classifying region of FIG. 7.
Figure 8B:
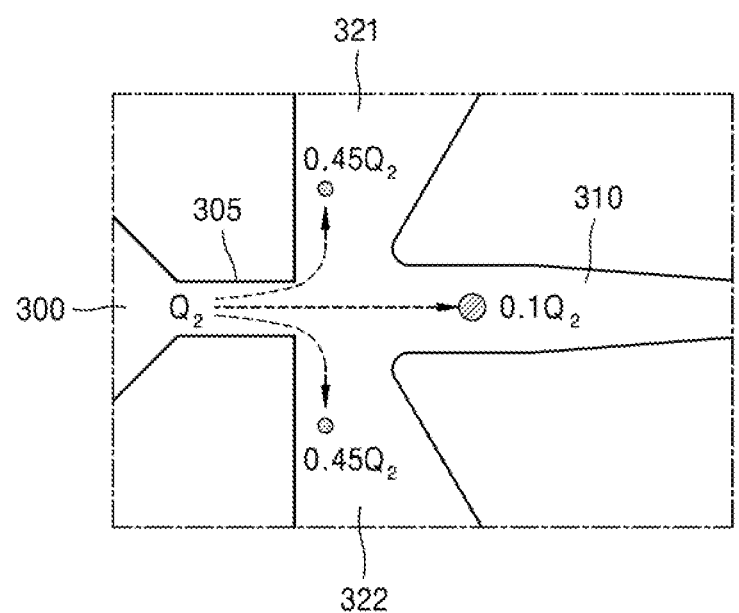
FIG. 8B is an enlarged diagram schematically illustrating a second fine dust classifying region of FIG. 7.
Figure 8C:
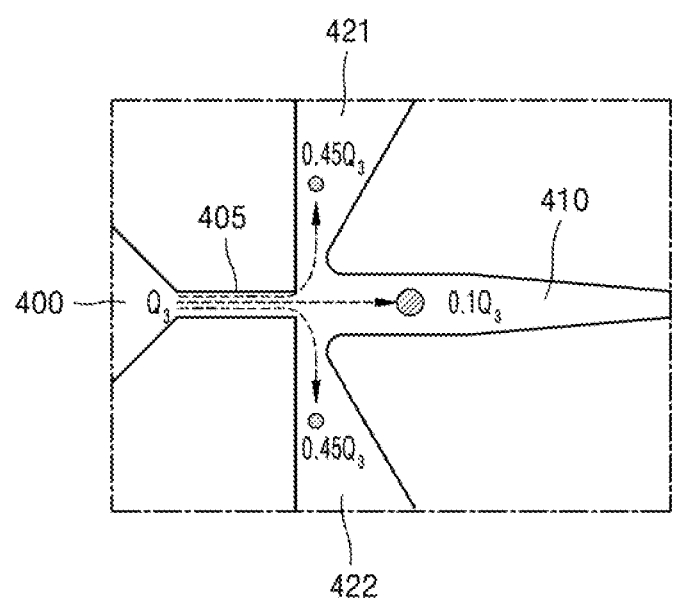
FIG. 8C is an enlarged diagram schematically illustrating a third fine dust classifying region of FIG. 7.

FIG. 7 is a plan view schematically illustrating a fine dust measurement device according to an example embodiment. FIG. 8A is an enlarged diagram schematically illustrating a first fine dust classifying region $C_1$ of FIG. 7. FIG. 8B is an enlarged diagram schematically illustrating a second fine dust classifying region $C_2$ of FIG. 7. FIG. 8C is an enlarged diagram schematically illustrating a third fine dust classifying region $C_3$ of FIG. 7.

With reference to FIG. 7, a fine dust measurement device 1 according to an example embodiment may include a first fine dust measurement module 20 including a first fluid inlet 200 into which fluid including fine dust flows, a second fine dust measurement module 30 including a second fluid inlet 300 into which fluid including fine dust flows, a third fine dust measurement module 40 including a third fluid inlet 400 into which fluid including fine dust flows, and an outlet 80 connected to each of the first to third fine dust measurement modules 20, 30, and 40 and discharging the fluid. For example, the first to third fine dust measurement modules 20, 30, and 40 may be arranged on the same plane in parallel at regular intervals. In the above-described example embodiment, the fine dust measurement device 1 is described as including three fine dust measurement modules; however, the disclosure is not limited thereto. The fine dust measurement device 1 may include two or more fine dust measurement modules.

The first fine dust measurement module 20 according to an example embodiment may include the first fluid inlet 200, a 1-1 channel (e.g., a first channel) 210 through which 1-1 fine dust with particles having a diameter greater than or equal to the first diameter passes, a 1-2 channel (e.g., a second channel) 220 through which 1-2 fine dust with particles having a diameter less than the first diameter passes, a first flow ratio control nozzle 230, a 1-3 channel (e.g., a second merged region) 250, a first fine dust sensor, and a first micro-heater.

For example, a part of the 1-1 channel 210 and the 1-2 channel 220 may be arranged on different planes in a double-layer structure. For example, the 1-1 channel 210 may include a 1-11 channel (e.g., a first region) 211 arranged on the same plane as the 1-2 channel 220, a 1-12 channel (e.g., a second region) 212 connected to the 1-11 channel 211 and arranged on a different plane than the 1-2 channel 220, and a 1-13 channel (e.g., a third region) 213 connected to the 1-12 channel 212 and arranged on the same plane as the 1-2 channel 220.

Further, the second fine dust measurement module 30 according to an example embodiment may include the second fluid inlet 300, a 2-1 channel (e.g., a first channel) 310 through which 2-1 fine dust with particles having a diameter greater than or equal to the second diameter passes, a 2-2 channel (e.g., a second channel) 320 through which 2-2 fine dust with particles having a diameter less than the second diameter passes, a second flow ratio control nozzle 330, a 2-3 channel (e.g., a second merged region) 350, a second fine dust sensor, and a second micro-heater.

For example, a part of the 2-1 channel 310 and the 2-2 channel 320 may be arranged on different planes in a double-layer structure. For example, the 2-1 channel 310 may include a 2-11 channel (e.g., a first region) 311 arranged on the same plane as the 2-2 channel 320, a 2-12 channel (e.g., a second region) 312 connected to the 2-11 channel 311 and arranged on a different plane than the 2-2 channel 320, and a 2-13 channel (e.g., a third region) 313 connected to the 2-12 channel 312 and arranged on the same plane as the 2-2 channel 320.

Further, the third fine dust measurement module 40 according to an example embodiment may include the third fluid inlet 400, a 3-1 channel (e.g., a first channel) 410 through which 3-1 fine dust with particles having a diameter greater than or equal to the third diameter passes, a 3-2 channel (e.g., a second channel) 420 through which 3-2 fine dust with particles having a diameter less than the third diameter passes, a third flow ratio control nozzle 430, a 3-3 channel (e.g., a second merged region) 450, a third fine dust sensor, and a third micro-heater.

For example, a part of the 3-1 channel 410 and the 3-2 channel 420 may be arranged on different planes in a double-layer structure. For example, the 3-1 channel 410 may include a 3-11 channel (e.g., a first region) 411 arranged on the same plane as the 3-2 channel 420, a 3-12 channel (e.g., a second region) 412 connected to the 3-11 channel 411 and arranged on a different plane than the 3-2 channel 420, and a 3-13 channel (e.g., a third region) 413 connected to the 3-12 channel 412 and arranged on the same plane as the 3-2 channel 420.

As the first to third fluid inlets 200, 300, and 400, the 1-1 to 3-1 channels 210, 310, and 410, the 1-2 to 3-2 channels 220, 320, and 420, the first to third flow ratio control nozzles 230, 330, and 430, the 1-3 to 3-3 channels 250, 350, and 450, the first to third fine dust sensors, and the first to third micro-heaters included in the first to third fine dust measurement modules 20, 30, and 40 are substantially the same as the fluid inlet 100, the first channel 110, the second channel 120, the flow ratio control nozzle 130, the third channel 150, the fine dust sensor 160, and the micro-heater 170 illustrated in FIGS. 1 to 4, respectively, any redundant descriptions thereon are omitted for convenience in explanation.

In an example embodiment, the first diameter of fine dust classified at the first fine dust measurement module 20, the second diameter of fine dust classified at the second fine dust measurement module 30, and the third diameter of fine dust classified at the third fine dust measurement module 40 may be different. The diameter of fine dust classified in the first to third fine dust measurement modules 20, 30, and 40 may be determined differently depending on a cross-sectional area of a connection channel between the fluid inlet and the first and second channels.

With reference to FIGS. 8A to 8C, the first fine dust measurement module 20 may include a first connection channel 205 connecting the first fluid inlet 200 to the 1-1 channel 210 and the 1-2 channel 220, and the second fine dust measurement module 30 may include a second connection channel 305 connecting the second fluid inlet 300 to the 2-1 channel 310 and the 2-2 channel 320. In addition, the third fine dust measurement module 40 may include a third connection channel 405 connecting the third fluid inlet 400 to the 3-1 channel 410 and the 3-2 channel 420, and at this time, a cross-sectional area of the first connection channel 205 may be the greatest, a cross-sectional area of the second connection channel 305 may be the second greatest, and a cross-sectional area of the third connection channel 405 may be the smallest. At this time, the first diameter of fine dust classified at the first fine dust measurement module 20, the second diameter of fine dust classified at the second fine dust measurement module 30, and the third diameter of fine dust classified at the third fine dust measurement module 40 may decrease sequentially. For example, sequentially, the first diameter may be reduced to 2.5 µm, the second diameter may be reduced to 1.0 µm, and the third diameter may be reduced to 0.3 µm. However, the disclosure is not limited thereto, and the first diameter of fine dust classified at the first fine dust measurement module 20, the second diameter of fine dust classified at the second fine dust measurement module 30, and the third diameter of fine dust classified at the third fine dust measurement module 40 may be adjusted in a different way.

According to an example embodiment, a flow ratio of fluid flowing into each of the first channel and the second channel included in each of the first to third fine dust measurement modules 20, 30, and 40 may be controlled to remain constant by using the flow ratio control nozzle. For example, the first flow ratio control nozzle 230 included in the first fine dust measurement module 20 may be arranged in the 1-1 channel 210 and control a flow ratio of fluid flowing into the 1-1 channel 210 and the 1-2 channel 220. For example, the cross-sectional area of the first flow ratio control nozzle 230 may be adjusted to control a flow ratio between fluid flowing into the 1-1 channel 210 and fluid flowing into the 1-2 channel 220. For example, a flow quantity $0.1Q_1$ of the fluid flowing into the 1-1 channel 210 may be 10% of a flow quantity $Q_1$ of fluid introduced through the first fluid inlet 200, and a flow quantity $0.45Q_1$ of fluid flowing into each of the 1-21 channel 221 and the 1-22 channel 222 may be 45% of the flow quantity $Q_1$ of the fluid introduced through the first fluid inlet 200. That is, a flow ratio between the fluid flowing into the 1-1 channel 210 and the fluid flowing into the 1-2 channel 220 may be 1:9.

Also, the second flow ratio control nozzle 330 included in the second fine dust measurement module 30 may be arranged in the 2-1 channel 310 and control a flow ratio of fluid flowing into the 2-1 channel 310 and the 2-2 channel 320. For example, a flow ratio between the fluid flowing into the 2-1 channel 310 and the fluid flowing into the 2-2 channel 320 may also be 1:9.

Also, the third flow ratio control nozzle 430 included in the third fine dust measurement module 40 may be arranged in the 3-1 channel 410 and control a flow ratio of fluid flowing into the 3-1 channel 410 and the 3-2 channel 420. For example, a flow ratio between the fluid flowing into the 3-1 channel 410 and the fluid flowing into the 3-2 channel 420 may also be 1:9.

Figure 9:
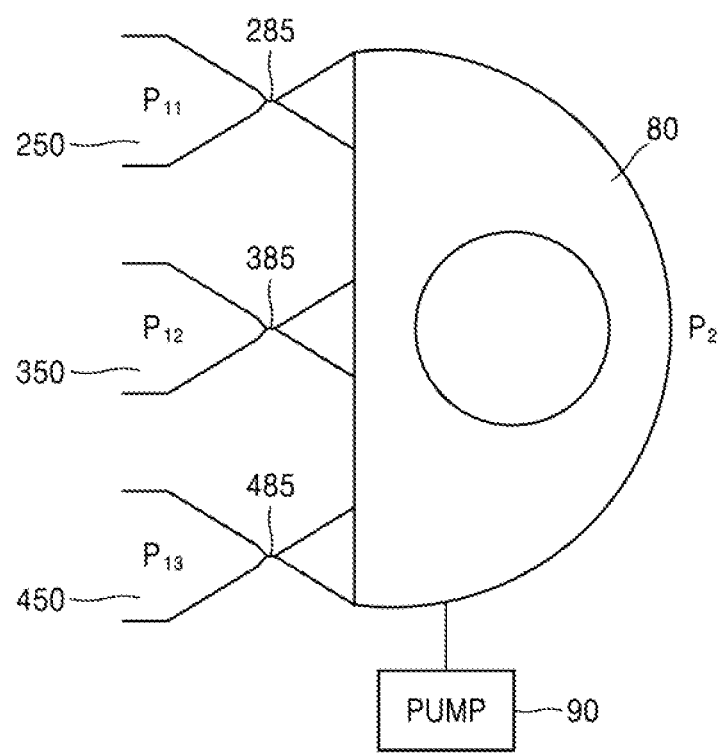
FIG. 9 is a schematic diagram illustrating a 3-1 channel, a 3-2 channel, a 3-3 channel, a first choked nozzle, a second choked nozzle, a third choked nozzle, an outlet, and a pump according to an example embodiment.

FIG. 9 is a schematic diagram illustrating a 1-3 channel, a 2-3 channel, a 3-3 channel, a first choked nozzle, a second choked nozzle, a third choked nozzle, an outlet, and a pump according to an example embodiment.

With reference to FIGS. 7 and 9, after the detection of concentration of the 1-2 fine dust (particles having weak inertia) is completed in the first fine dust measurement module 20 according to an example embodiment, the fluid which has been diverged into the 1-1 channel 210 and the 1-2 channel 220 may be merged again in the 1-3 channel 250. The fluid merged in the 1-3 channel 250 may be discharged to the outside through the outlet 80. At this time, the outlet 80 may be arranged to intercommunicate with the 1-3 channel 250 by way of the first choked nozzle 285 provided therebetween.

For example, the first choked nozzle 285 may be arranged between the 1-3 channel 250 and the outlet 80, and when a ratio of a second pressure $P_2$ inside the outlet 80 to a first pressure $P_{11}$ inside the 1-3 channel 250 is maintained lower than or equal to a certain ratio, for example, 0.528, the velocity of the fluid passing through the first choked nozzle 285 may be maintained at a constant velocity. For example, the 1-1 pressure $P_{11}$ inside the 1-3 channel 250 and the second pressure $P_2$ inside the outlet 80 may be adjusted by using the pump 90 connected to the cross-sectional area of the first choked nozzle 285 and the outlet 80.

Further, after the detection of concentration of the 2-2 fine dust (particles having weak inertia) is completed in the second fine dust measurement module 30 according to an example embodiment, the fluid which has been diverged into the 2-1 channel 310 and the 2-2 channel 320 may be merged again in the 2-3 channel 350. The fluid merged in the 2-3 channel 350 may be discharged to the outside through the outlet 80. At this time, the outlet 80 may be arranged to intercommunicate with the 2-3 channel 350 by way of the second choked nozzle 385 provided therebetween.

For example, the second choked nozzle 385 may be arranged between the 2-3 channel 350 and the outlet 80, and when a ratio of the second pressure $P_2$ inside the outlet 80 to a 2-1 pressure $P_{12}$ inside the 2-3 channel 350 is maintained lower than or equal to a certain ratio, for example, 0.528, the velocity of the fluid passing through the second choked nozzle 385 may be maintained at a constant velocity. For example, the 2-1 pressure $P_{12}$ inside the 2-3 channel 350 and the second pressure $P_2$ inside the outlet 80 may be adjusted by using the pump 90 connected to the cross-sectional area of the second choked nozzle 385 and the outlet 80.

Further, after the detection of concentration of the 3-2 fine dust (particles having weak inertia) is completed in the third fine dust measurement module 40 according to an example embodiment, the fluid which has been diverged into the 3-1 channel 410 and the 3-2 channel 420 may be merged again in the 3-3 channel 450. The fluid merged in the 3-3 channel 450 may be discharged to the outside through the outlet 80. At this time, the outlet 80 may be arranged to intercommunicate with the 3-3 channel 450 by way of third choked nozzle 485 provided therebetween.

For example, the third choked nozzle 485 may be arranged between the 3-3 channel 450 and the outlet 80, and when a ratio of the second pressure $P_2$ inside the outlet 80 to a 3-1 pressure $P_{13}$ inside the 3-3 channel 450 is maintained lower than or equal to a certain ratio, for example, 0.528, the velocity of the fluid passing through the third choked nozzle 485 may be maintained at a constant velocity. For example, the 3-1 pressure $P_{13}$ inside the 3-3 channel 450 and the second pressure $P_2$ inside the outlet 80 may be adjusted by using the pump 90 connected to the cross-sectional area of the third choked nozzle 485 and the outlet 80.

For example, when a ratio of the second pressure $P_2$ inside the outlet 80 to the 1-1 pressure $P_{11}$ in the 1-3 channel 250 is 0.31, a ratio of the second pressure $P_2$ inside the outlet 80 to the 2-1 pressure $P_{12}$ inside the 2-3 channel 350 is 0.313, and a ratio of the second pressure $P_2$ inside the outlet 80 to the 3-1 pressure $P_{13}$ inside the 3-3 channel 450 is 0.35, the pressure ratio may be maintained lower than or equal to 0.528, and accordingly, the velocity of fluid passing through the first choked nozzle 285, the second choked nozzle 385, and the third choked nozzle 485 may be a constant velocity. At this time, the diameter of the first choked nozzle 285, the second choked nozzle 385, and the third choked nozzle 485 may be set to 30 μm, 31 μm, and 35 μm, respectively. Accordingly, the flow quantity of fluid flowing in the first to third fine dust measurement modules 20, 30, and 40 may remain constant.

That is, by adjusting a relative pressure by using the pump 90 connected to the cross-sectional areas of the first choked nozzle 285, the second choked nozzle 385, and the third choked nozzle 485 and the outlet 80, the flow quantity of fluid flowing in the first to third fine dust measurement modules 20, 30, and 40 may be controlled to remain constant, and accordingly, the accuracy of fine dust measurement may increase.

According to an example embodiment of the disclosure, a fine dust measurement module and a fine dust measurement device, which are capable of classifying fine dust included in the air by its diameter for quick and effective identification while having a simple structure may be implemented. However, the scope of the disclosure is not limited to the above mentioned effects.

It should be understood that example embodiments described herein should be considered in a descriptive sense only and not for purposes of limitation. Descriptions of features or aspects within each embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:
1. A fine dust measurement module comprising:
 a fluid inlet into which fluid including fine dust with particles of various diameters flows;
 a first channel through which first fine dust, of the fine dust introduced through the fluid inlet, with first particles having a diameter greater than or equal to a first diameter passes;

a second channel through which second fine dust, of the fine dust introduced through the fluid inlet, with second particles having a diameter less than the first diameter passes;
a flow ratio control nozzle provided in the first channel and configured to control a flow ratio between a first portion of the fluid flowing into the first channel and a second portion of the fluid flowing into the second channel; and
a fine dust sensor configured to sense the second fine dust passing through the second channel,
wherein the first channel comprises:
a first region provided on a same plane as the second channel;
a second region connected to the first region and provided on a different plane than the second channel; and
a third region connected to the second region and provided on the same plane as the second channel.

2. The fine dust measurement module of claim 1, wherein the flow ratio between the first portion of the fluid flowing into the first channel and the second portion of the fluid flowing into the second channel is 1:9.

3. The fine dust measurement module of claim 1, wherein the second channel comprises:
a first sub-channel and a second sub-channel which each diverge from the first channel; and
a first merged region in which the first sub-channel and the second sub-channel are merged.

4. The fine dust measurement module of claim 3, wherein the fine dust sensor is provided in the first merged region.

5. The fine dust measurement module of claim 1, wherein the fine dust sensor comprises a mass sensor configured to directly sense a mass of the second fine dust passing through the second channel.

6. The fine dust measurement module of claim 5, further comprising a micro-heater arranged across the second channel from the fine dust sensor.

7. The fine dust measurement module of claim 1, wherein the first channel further comprises:
a first connection connecting the first region to the second region; and
a second connection connecting the second region to the third region.

8. The fine dust measurement module of claim 1, further comprising:
a second merged region in which the first channel and the second channel are merged; and
an outlet connected to the second merged region and discharging the fluid.

9. The fine dust measurement module of claim 8, wherein a ratio of an internal pressure of the outlet to a first pressure inside the second merged region is less than or equal to 0.528.

10. The fine dust measurement module of claim 9, further comprising a choked nozzle provided between the second merged region and the outlet.

11. The fine dust measurement module of claim 9, further comprising a pump connected to the outlet and configured to control the internal pressure of the outlet.

12. A fine dust measurement device comprising:
a first fine dust measurement module comprising a first fluid inlet;
a second fine dust measurement module comprising a second fluid inlet;
a third fine dust measurement module comprising a third fluid inlet; and
an outlet connected to each of the first fine dust measurement module, the second fine dust measurement module, and the third fine dust measurement module,
wherein the first fluid inlet is a fluid inlet into which fluid including fine dust with particles of various diameters flows,
wherein the first fine dust measurement module further comprises:
a first channel through which first fine dust, of the fine dust introduced through the fluid inlet, with first particles having a diameter greater than or equal to a first diameter passes;
a second channel through which second fine dust, of the fine dust introduced through the fluid inlet, with second particles having a diameter less than the first diameter passes;
a flow ratio control nozzle provided in the first channel and configured to control a flow ratio between a first portion of the fluid flowing into the first channel and a second portion of the fluid flowing into the second channel; and
a fine dust sensor configured to sense the second fine dust passing through the second channel, and
wherein the first channel comprises:
a first region provided on a same plane as the second channel;
a second region connected to the first region and provided on a different plane than the second channel; and
a third region connected to the second region and provided on the same plane as the second channel.

13. The fine dust measurement device of claim 12, wherein the first fine dust measurement module, the second fine dust measurement module, and the third fine dust measurement module are arranged in parallel.

14. The fine dust measurement device of claim 12, wherein each of the first fine dust measurement module, the second fine dust measurement module, and the third fine dust measurement module further comprises a connection channel connecting the respective one of the first fluid inlet, the second fluid inlet, and the third fluid inlet to the respective first channel and the respective second channel, and
wherein each respective connection channel has a different cross-sectional area from each other respective connection channel.

15. The fine dust measurement device of claim 12, wherein, for each of the first fine dust measurement module, the second fine dust measurement module, and the third fine dust measurement module, the flow ratio between the first portion of the fluid flowing into the first channel and the second portion of the fluid flowing into the second channel is 1:9.

16. The fine dust measurement device of claim 12, wherein each of the first fine dust measurement module, the second fine dust measurement module, and the third fine dust measurement module further comprises a merged region in which the first channel and the second channel are merged.

17. The fine dust measurement device of claim 16, wherein, for each of the first fine dust measurement module, the second fine dust measurement module, and the third fine dust measurement module, a ratio of an internal pressure of the outlet to a pressure inside the merged region is less than or equal to 0.528.

18. The fine dust measurement device of claim 17, further comprising:

a first choked nozzle provided between the merged region of the first fine dust measurement module and the outlet;
a second choked nozzle provided between the merged region of the second fine dust measurement module and the outlet; and
a third choked nozzle provided between the merged region of the third fine dust measurement module and the outlet.

19. The fine dust measurement device of claim 12, further comprising a pump connected to the outlet and configured to control an internal pressure of the outlet.

20. The fine dust measurement device of claim 12, wherein, for each of the first fine dust measurement module, the second fine dust measurement module, and the third fine dust measurement module, the fine dust sensor comprises a mass sensor configured to directly sense a mass of the second fine dust passing through the second channel.

21. The fine dust measurement device of claim 20, wherein each of the first fine dust measurement module, the second fine dust measurement module, and the third fine dust measurement module further comprises a micro-heater provided across the second channel from the fine dust sensor.

22. The fine dust measurement device of claim 12, wherein a respective first channel of each of the second fine dust measurement module and the third fine dust measurement module comprises:
　　a respective first region provided on the same plane as a respective second channel;
　　a respective second region connected to the first region and provided on a different plane than the respective second channel; and
　　a respective third region connected to the second region and provided on the same plane as the respective second channel.

23. A fine dust measurement module comprising:
　a fluid inlet into which fluid including fine dust with particles of various diameters flows;
　a first channel through which first fine dust, of the fine dust introduced through the fluid inlet, with first particles having a diameter greater than or equal to a first diameter passes;
　a second channel through which second fine dust, of the fine dust introduced through the fluid inlet, with second particles having a diameter less than the first diameter passes;
　a flow ratio control nozzle provided in the first channel and configured to control a flow ratio between a first portion of the fluid flowing into the first channel and a second portion of the fluid flowing into the second channel;
　a fine dust sensor configured to sense the second fine dust passing through the second channel;
　a second merged region in which the first channel and the second channel are merged;
　an outlet connected to the second merged region and discharging the fluid; and
　a choked nozzle provided between the second merged region and the outlet,
　wherein a ratio of an internal pressure of the outlet to a first pressure inside the second merged region is less than or equal to 0.528.

* * * * *